US011636446B2

(12) United States Patent
Scott et al.

(10) Patent No.: US 11,636,446 B2
(45) Date of Patent: Apr. 25, 2023

(54) SYSTEMS AND METHODS FOR PROVIDING STATUS-BASED MAINTENANCE SCHEDULES

(71) Applicant: ORACLE INTERNATIONAL CORPORATION, Redwood Shores, CA (US)

(72) Inventors: Kimberley M. Scott, Lafayette, CA (US); Barry J. DeMartini, Pleasanton, CA (US); Charles E. Ruppert, Berkeley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 788 days.

(21) Appl. No.: 15/181,564

(22) Filed: Jun. 14, 2016

(65) Prior Publication Data

US 2017/0357952 A1 Dec. 14, 2017

(51) Int. Cl.
*G06Q 10/00* (2012.01)
*G06Q 30/00* (2012.01)
*G06Q 10/10* (2012.01)
*G06Q 10/20* (2023.01)
*G06Q 30/012* (2023.01)
*G06Q 10/1093* (2023.01)

(52) U.S. Cl.
CPC ......... *G06Q 10/20* (2013.01); *G06Q 10/1097* (2013.01); *G06Q 30/012* (2013.01)

(58) Field of Classification Search
USPC ............................................... 705/7.11–7.42
See application file for complete search history.

(56) References Cited

U.S. PATENT DOCUMENTS

| | | | |
|---|---|---|---|
| 7,683,787 B2 | 3/2010 | Czyszczewski et al. | |
| 8,290,746 B2 | 10/2012 | Urmanov et al. | |
| 8,566,182 B2 | 10/2013 | Brower et al. | |
| 9,524,309 B2* | 12/2016 | Ewer | G06Q 10/087 |
| 9,569,445 B2 | 2/2017 | Flores et al. | |
| 9,665,433 B2* | 5/2017 | Grewal | G06Q 10/087 |
| 11,194,321 B2 | 12/2021 | Akula | |
| 2005/0131729 A1* | 6/2005 | Melby | G06Q 10/20 |
| | | | 705/305 |

(Continued)

OTHER PUBLICATIONS

Velmurugan, R S; Dhingra, Tarun, Maintenance strategy selection and its impact in maintenance function International Journal of Operations & Production Management 35.12: 1622-1661. Bradford: Emerald Group Publishing Limited. (2015) (Year: 2015).*

(Continued)

*Primary Examiner* — Amber A Misiaszek
(74) *Attorney, Agent, or Firm* — Kraguljac Law Group, LLC

(57) ABSTRACT

Systems, methods, and other embodiments are disclosed for automatically changing a maintenance strategy for an asset. In one embodiment, status data from an asset record of an asset to be maintained is read. The status data indicates a current status of the asset. A maintenance schedule record is selected from multiple maintenance schedule records based on the status data. The multiple maintenance schedule records are associated with a maintenance specification record of the asset. The selected maintenance schedule record is assigned to the asset record of the asset. The maintenance schedule record includes at least one trigger record including trigger data indicating when preventive maintenance is to be performed on the asset. A preventive maintenance work order record is transmitted, in accordance with a trigger record, to direct preventive maintenance to be performed on the asset.

20 Claims, 9 Drawing Sheets

(56) References Cited

U.S. PATENT DOCUMENTS

| | | | | |
|---|---|---|---|---|
| 2005/0253704 | A1* | 11/2005 | Neuwirth | G06Q 10/087 340/8.1 |
| 2006/0053075 | A1* | 3/2006 | Roth | G06Q 10/06 705/50 |
| 2011/0054806 | A1 | 3/2011 | Goldfine et al. | |
| 2012/0123951 | A1* | 5/2012 | Hyatt | G06Q 10/10 705/305 |
| 2015/0100571 | A1* | 4/2015 | Floyd | G06F 16/9537 707/724 |
| 2015/0364017 | A1* | 12/2015 | Hall | G06Q 10/06315 340/539.13 |
| 2016/0071004 | A1 | 3/2016 | Salahshoor et al. | |
| 2017/0248965 | A1* | 8/2017 | Wellman | H04W 4/40 |
| 2019/0156443 | A1* | 5/2019 | Hall | G06Q 30/0283 |

OTHER PUBLICATIONS

Oracle Corporation; Oracle Cloud: Developing Applications with Oracle Internet of Things Cloud Service, 19.1.5; pp. 1-201, Copyright 2015, 2019, Redwood Shores, CA.

James Kovacevic; High Performance Reliability; How Equipment Fails, Understanding the 6 Failure Patterns; pp. 1-4, Sep. 21, 2015; downloaded from: https://hpreliability.com/how-equipment-fails-understanding-the-6-failure-patterns/.

Oracle Corporation; Oracle Internet of Things Cloud Service; pp. 1-6, Copyright 2016, Redwood Shores, CA.

Oracle Corporation; Data Sheet / Oracle Maintenance Cloud, pp. 1-6, Copyright 2018, Redwood Shores, CA.

Safa Ayaz; Oracle Corporation; Oracle SCM Cloud Using Maintenance; pp. 1-102, copyright 2011, 2019, Redwood Shores, CA.

U.S. Patent and Trademark Office, Non-Final Office Action issued in U.S. Appl. No. 16/727,028, filed Dec. 26, 2019, dated Apr. 20, 2021 (17 pgs).

U.S. Patent and Trademark Office, Notice of Allowance issued in U.S. Appl. No. 16/727,028, filed Dec. 26, 2019 dated Aug. 3, 2021 (8 pgs).

U.S. Patent and Trademark Office, Non-Final Office Action issued in U.S. Appl. No. 17/532,554, filed Nov. 22, 2021, dated Nov. 10, 2022 (29 pgs).

U.S. Patent and Trademark Office, Notice of Allowance issued in U.S. Appl. No. 17/532,554, filed Nov. 22, 2021, dated Mar. 1, 2023 (10 pgs).

* cited by examiner

Preventive Maintenance Schedule: Pump - RAS, Pump - Singlestage, Centrifugal, Active Main | Analytics | Log ▲ Maintenance Schedule ▲ Main Information    Pump - RAS, Pump - Singlestage, Centrifugal, Active
    Status    Active
    Description    Pump - RAS
    Detailed Description    Pump - RAS
    Asset Type    Pump - Singlestage, Centrifugal ▲ Record Actions Edit | Delete | Duplicate ▲ Record Information ▲ Maintenance Trigger Maintenance Trigger → 1  10. General Monthly PM - Pump - RAS - Monthly Inspection, Duration: 1 Months, Calendar Interval, Active
→ 2  20. General Quarterly PM - Pump - RAS - Quarterly Inspection, Duration: 3 Months, Calendar Anniversary, Active
→ 3  30. General Bi-Annual PM - Pump - RAS - Biannual Inspection, Duration: 6 Months, Calendar Anniversary, Active
→ 4  40. General Annual PM - Pump - RAS - Annual Electrical Inspection, Duration: 1 Years, Calendar Anniversary, Active

SYSTEMS AND METHODS FOR PROVIDING STATUS-BASED MAINTENANCE SCHEDULES

BACKGROUND

Assets often require preventive maintenance to keep the assets in a functional and reliable condition. Assets sometimes undergo a long term operational change due to, for example, experiencing a functional failure or being changed from a low duty cycle (minimum use) state to a high duty cycle (continuous use) state. When such a long term operational change occurs, the maintenance strategy usually needs to change to ensure optimal asset reliability. Changing the maintenance strategy for an asset can involve an asset manager making time-consuming changes or updates in an Enterprise Asset Management (EAM) system.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

FIG. 4 graphically illustrates an example embodiment of a maintenance schedule record associated with the maintenance specification record of FIG. 3 and how one or more preventive maintenance trigger records are associated to that maintenance schedule record;

DETAILED DESCRIPTION

Figure 1:
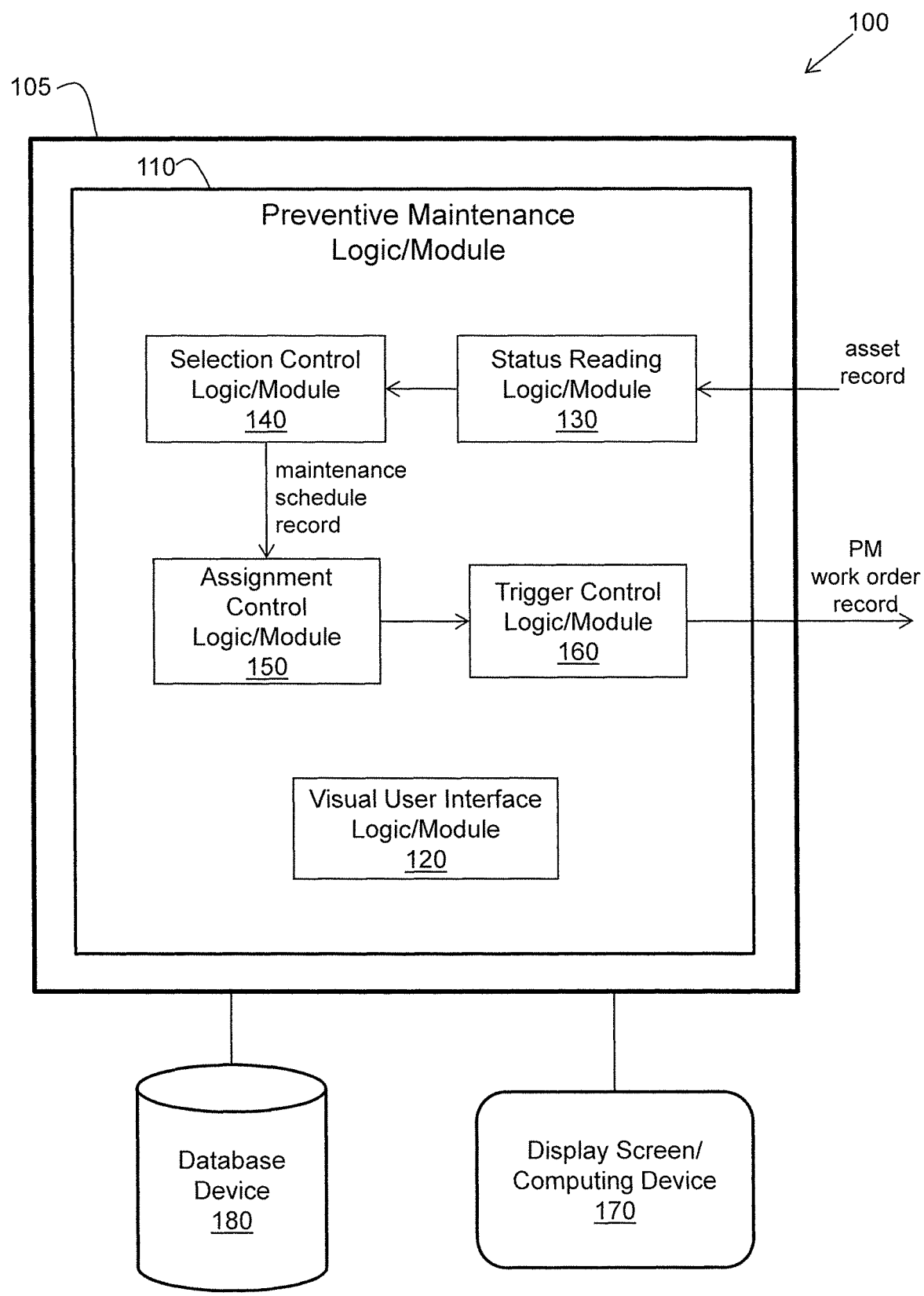
FIG. 1 illustrates one embodiment of a computer system, having a computing device configured with preventive maintenance logic.

Systems, methods, and other embodiments are disclosed that provide computerized control to automatically switch maintenance strategies for an asset to be maintained when a status of the asset changes. Such computerized control provides an improvement over the time-consuming maintenance strategy changes or updates that previously had to be manually made in an Enterprise Asset Management (EAM) system when the status of an asset changed. Depending on the status of an asset (e.g., in service, out of service, minimally used, heavily used) the preferred maintenance strategy for the asset may be different. For example, an asset that is in service and continuously used may require a maintenance strategy that provides multiple scheduled preventive maintenance sessions per year. An asset that is out of service may only require one scheduled preventive maintenance session per year.

In accordance with one embodiment, a computer-implemented method is disclosed for adaptively and automatically updating the maintenance strategy for an asset as the status of the asset changes. Status data from an asset record of the asset is read, indicating a current status of the asset. Selection of a maintenance schedule record, from multiple maintenance schedule records, is controlled based on the status data. Assigning (activating) of the selected maintenance schedule record to (for) the asset record is controlled based on the selection. The selected maintenance schedule record includes one or more trigger records which include trigger data. The trigger data indicates when preventive maintenance is to be performed on the asset and the template work order to be used in the creation of a new preventive maintenance work order. Transmitting of a preventive maintenance work order record is controlled, in accordance with the one or more trigger records, to direct preventive maintenance to be performed on the asset. In this manner, the technical field of enterprise asset management is improved.

The following terms are used herein with respect to various embodiments.

The term "asset", as used herein, refers to a piece of equipment (e.g., industrial or military equipment) that needs to be maintained over time.

The term "preventive maintenance", as used herein, refers to work that is regularly performed on an asset to decrease the chances of the asset failing. Preventive maintenance is performed while the asset is still working properly, such that the asset does not stop working unexpectedly.

The term "record", as used herein, is a type of data structure containing data. A record can be associated with other records or a record may include one or more other records. A record may be stored and linked to other records within a database, for example.

The term "cloud-accessible tools", as used herein, refers to computerized tools (usually residing on one or more server computers of a service provider) that can be accessed remotely by a user via a computerized network (e.g., the internet).

As used herein, assigning a maintenance schedule record to an asset record of an asset is equivalent to activating the maintenance schedule record for the asset.

FIG. 1 illustrates one embodiment of a computer system 100, having a computing device 105 configured with preventive maintenance logic 110. For example, in one embodiment, preventive maintenance logic 110 may be part of a larger computer application (e.g., a computerized enterprise asset and work management application), configured to help manage various aspects of the assets of an enterprise. Preventive maintenance logic 110 is configured to computerize the process of assigning appropriate maintenance schedules to (e.g., activating appropriate maintenance schedules for) various assets. The embodiments described herein take into consideration the current status of an asset and how the current status affects maintenance of the asset. In one embodiment, the system 100 is a computing/data processing system including an application or collection of distributed applications for enterprise organizations. The applications and computing system 100 may be configured to operate with or be implemented as a cloud-based networking system, a Software as a Service (SaaS) architecture, or other type of computing solution.

With reference to FIG. 1, in one embodiment, preventive maintenance logic 110 is implemented on the computing device 105 and includes logics or modules for implementing various functional aspects of preventive maintenance logic 110. In one embodiment, preventive maintenance logic 110 includes visual user interface logic/module 120, status reading logic/module 130, selection control logic/module 140, assignment control logic/module 150, and trigger control logic/module 160.

Other embodiments may provide different logics or combinations of logics that provide the same or similar functionality as preventive maintenance logic 110 of FIG. 1. In one embodiment, preventive maintenance logic 110 is an executable application including algorithms and/or program modules configured to perform the functions of the logics. The application is stored in a non-transitory computer storage medium. That is, in one embodiment, the logics of preventive maintenance logic 110 are implemented as modules of instructions stored on a computer-readable medium.

The computer system 100 also includes a display screen 170 operably connected to the computing device 105. In accordance with one embodiment, the display screen 170 is implemented to display views of and facilitate user interaction with a graphical user interface (GUI) generated by visual user interface logic 120 for viewing and modifying various types of records. The graphical user interface may be associated with a preventive maintenance algorithm and visual user interface logic 120 may be configured to generate the graphical user interface.

In one embodiment, the computer system 100 is a centralized server-side application that provides at least the functions disclosed herein and that is accessed by many users via computing devices/terminals communicating with the computer system 100 (functioning as the server) over a computer network. Thus the display screen 170 may represent multiple computing devices/terminals that allow users to access and receive services from preventive maintenance logic 110 via networked computer communications.

In one embodiment, the computer system 100 further includes at least one database device 180 operably connected to the computing device 105 and/or a network interface to access the database device 180 via a network connection. In accordance with one embodiment, the database device 180 is configured to store and manage data structures (e.g., records) associated with preventive maintenance logic 110 in a database system (e.g., a computerized enterprise asset and work management application). The data structures may include, for example, records of assets, maintenance specifications, maintenance schedules, triggers, and work orders.

Referring back to the logics of preventive maintenance logic 110 of FIG. 1, in one embodiment, visual user interface logic 120 is configured to generate a graphical user interface (GUI) to facilitate user interaction with preventive maintenance logic 110. For example, visual user interface logic 120 includes program code that generates and causes the graphical user interface to be displayed based on an implemented graphical design of the interface. In response to user actions and selections via the GUI, associated aspects of modifying records may be manipulated. For example, in one embodiment, visual user interface logic 120 is configured to control user modification of trigger data in trigger records, user modification of values of status data for selecting maintenance schedule records, and user extension of status data types.

Referring again to FIG. 1, in one embodiment, status reading logic 130 is configured to read status data from an asset record of an asset to be maintained. The asset record of the asset may be available from the database device 180. For example, in one embodiment, the database device 180 may send a message to preventive maintenance logic 110, indicating that the status of an asset has changed (i.e., the status data has been updated). Preventive maintenance logic 110 may then access the asset record from the database device 180 and read the status data. The status data indicates a current status of the asset. For example, a status of an asset may be one or more of "in service", "out of service", "high duty cycle", "low duty cycle", "under warranty", or "not under warranty". Other types of statuses may be possible as well. In accordance with another embodiment, status reading logic 130 periodically reads asset records from the database device 180 to determine if the status has changed.

An asset having a status of "in service" means that the asset is currently being used. An asset having a status of "out of service" means that the asset is currently not in use. An asset having a status of "high duty cycle" means that the asset is currently being used frequently (maybe even continuously). An asset having a status of "low duty cycle" means that the asset is currently being used infrequently. An asset having a status of "under warranty" means that the asset is currently under warranty (e.g., a refund, repair, or replacement will be made if the product or service is defective, fails, or is unsatisfactory, especially within a given time period). An asset having a status of "not under warranty" means that the asset is currently not under warranty. A status of an asset may be reflected by a combination of status data such as, for example, "in service" and "low duty cycle", or "in service" and "under warranty". Other combinations are possible as well.

Figure 2:
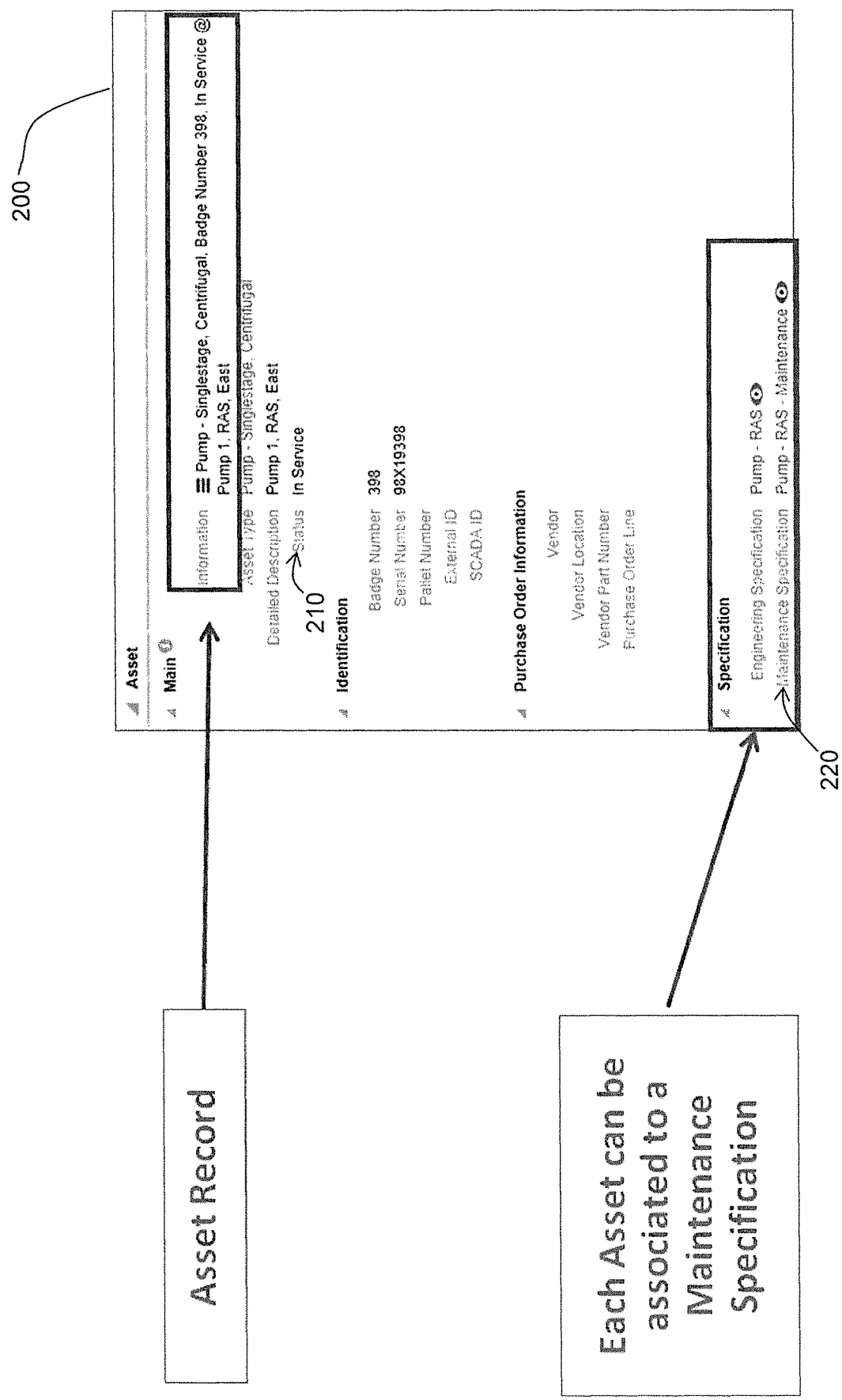
FIG. 2 graphically illustrates an example embodiment of an asset record and how a maintenance specification record is related to the asset record.

FIG. 2 graphically illustrates an example embodiment of an asset record 200 of an asset. The status 210 of the asset is shown in the asset record 200 as being "in service" and is represented as status data in the asset record 200. The asset is associated with a maintenance specification record 220 as shown in the asset record 200. A maintenance specification record may specify the type of maintenance to be performed on an asset. The asset shown in the asset record 200 is a pump.

In accordance with one embodiment, selection control logic 140 is configured to receive the status data from status reading logic 130. Selection control logic 140 is configured to control selection of a maintenance schedule record from multiple maintenance schedule records based on the status data. The multiple maintenance schedule records are associated with the maintenance specification record 220 for the asset. For example, the status data may indicate to selection control logic 140 to select a maintenance schedule record associated with a status of "in service". Maintenance schedule records are configured a priori based on the different possible statuses of an asset.

Figure 3:
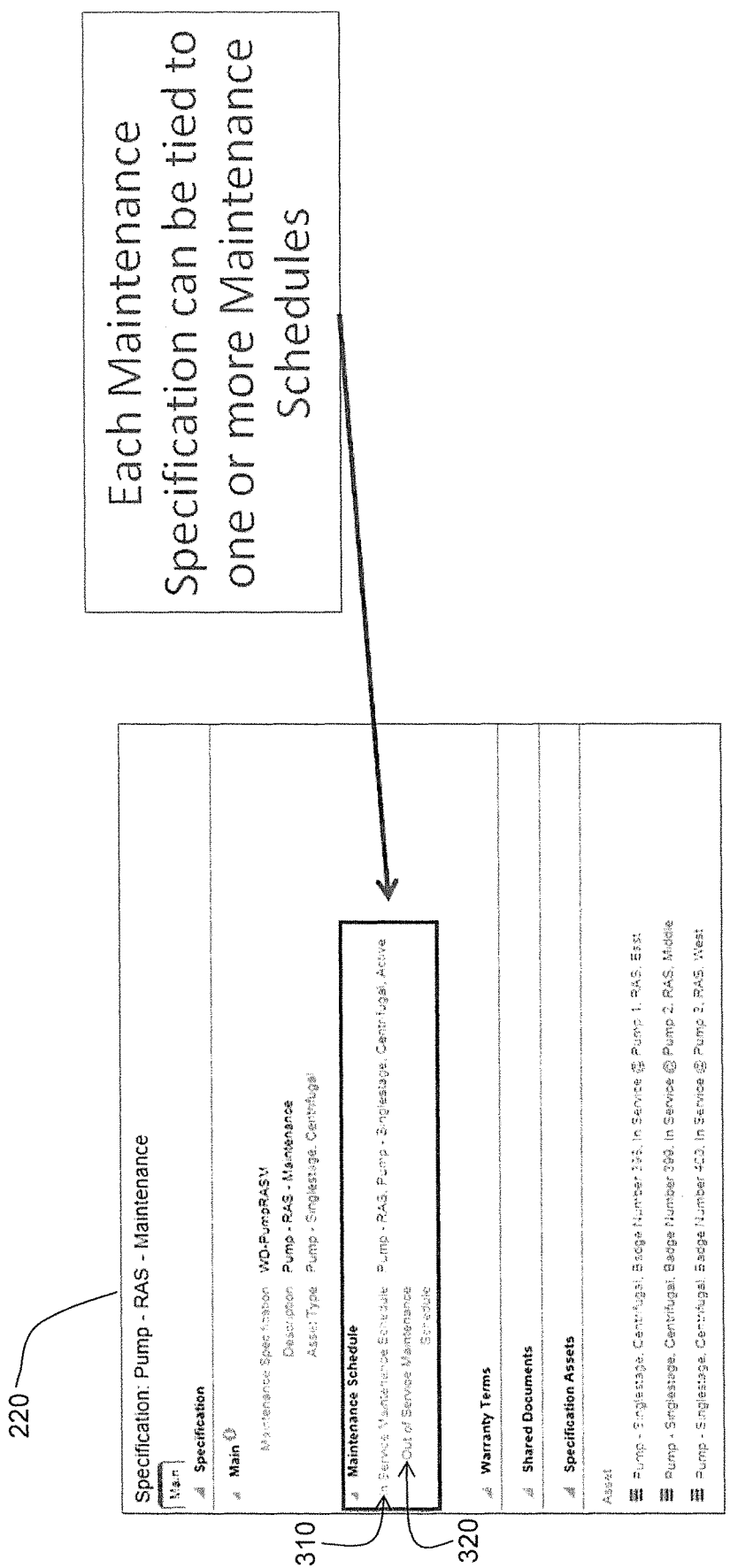
FIG. 3 graphically illustrates an example embodiment of a maintenance specification record associated with the asset record of FIG. 2.

FIG. 3 graphically illustrates an example embodiment of the maintenance specification record 220 associated with the asset record 200 of FIG. 2. The maintenance specification record 220 is associated with two maintenance schedule records 310 and 320 as shown in FIG. 3. Maintenance schedule record 310 is an "in service" maintenance schedule record (i.e., a maintenance schedule record that may be followed when the asset is in service, according to the status data). Maintenance schedule record 320 is an "out of service" maintenance schedule record (i.e., a maintenance schedule record that may be followed when the asset is out of service, according to the status data).

Referring again to FIG. 1, in one embodiment, assignment control logic 150 is configured to control assigning of (e.g., activating of) the selected maintenance schedule record to (for) the asset record of the asset. For example, assignment control logic 150 may assign maintenance schedule record 310 to the asset record 200 in response to maintenance schedule record 310 being selected (the assignment is shown in FIG. 3 by maintenance schedule record 310 being "active"). In accordance with one embodiment, a maintenance schedule record includes one or more trigger records. A trigger record includes trigger data that indicates when preventive maintenance is to be performed on an asset and the template work order used to create each new preventive maintenance work order.

FIG. 4 graphically illustrates an example embodiment of the maintenance schedule record 310 associated with the maintenance specification 220 of FIG. 3. The maintenance schedule record 310 includes four (4) trigger records 410, 420, 430, and 440 that respectively indicate that preventive maintenance is to be performed on the associated asset at one month, three months, six months, and one year. The one month, three months, six months, and one year may be with respect to, for example, a date when preventive maintenance was last performed on the asset, a date when the asset last went into service, or some other date.

In one embodiment, trigger control logic 160 is configured to transmit a preventive maintenance work order record, in accordance with a trigger record, to direct preventive maintenance to be performed on the asset. For example, referring to the maintenance schedule record 310 of FIG. 4, when the three-month date occurs, with trigger record 420 being active, trigger control logic 160 is triggered to send a preventive maintenance work order record to a maintenance worker (e.g., to a mobile device of the maintenance worker). The preventive maintenance work order record tells the maintenance worker to perform preventive maintenance on the asset (e.g., a pump) to which the maintenance schedule record 310 is assigned.

In this manner, as the status of an asset changes, as reflected in an asset record of the asset, the maintenance strategy can also change in response by automatically assigning (activating) a different maintenance schedule record to (for) the asset record. In one embodiment, a maintenance schedule record can be assigned to an asset record by activating the maintenance schedule record within a maintenance specification record for the asset.

Figure 5:
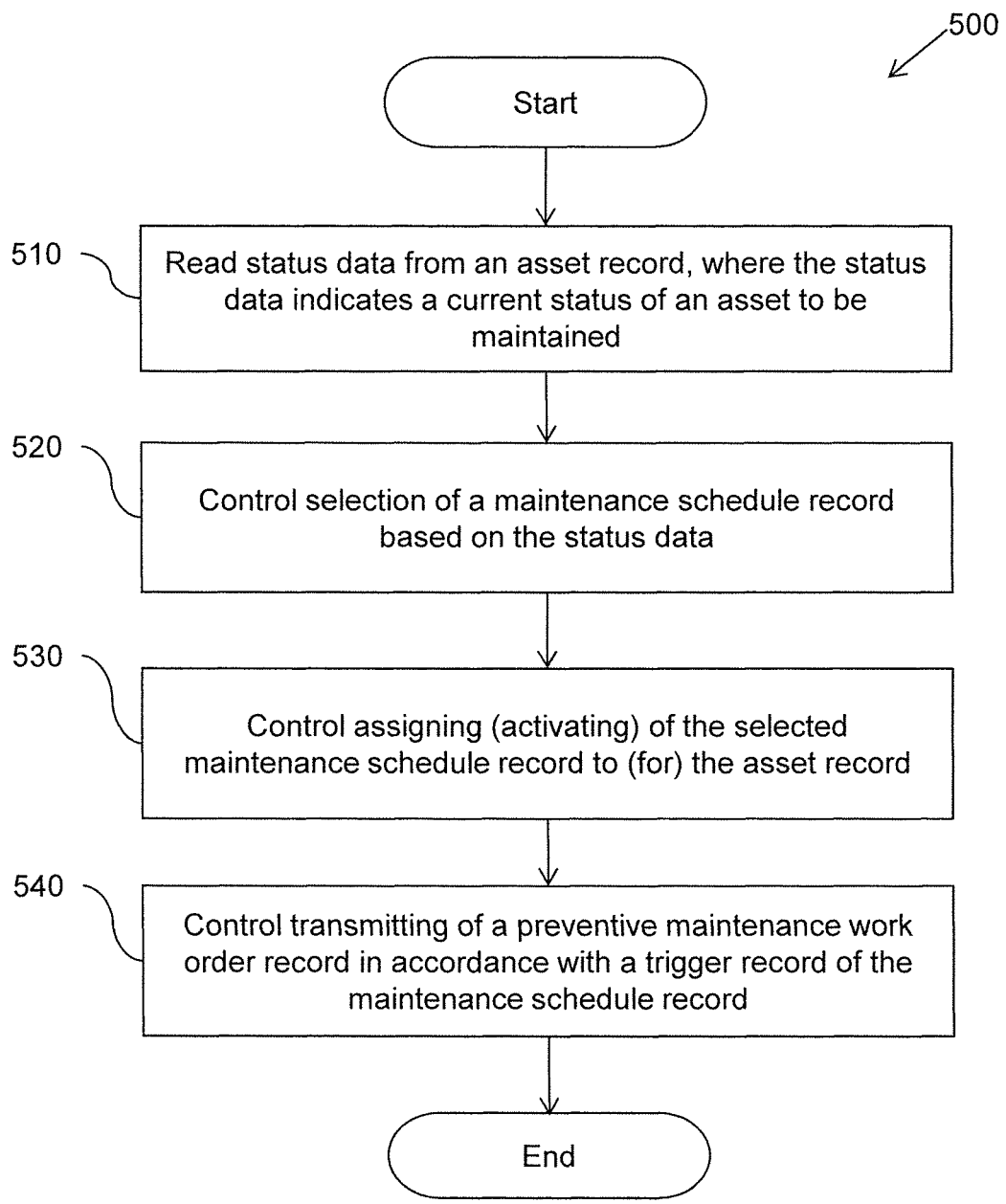
FIG. 5 illustrates one embodiment of a method, which can be performed by preventive maintenance logic of the computer system of FIG. 1, for controlling selection of a maintenance strategy based on a current status of an asset.

FIG. 5 illustrates one embodiment of a method 500, which can be performed by preventive maintenance logic 110 of the computer system 100 of FIG. 1, for controlling selection of a maintenance strategy based on a current status of an asset. Method 500 describes operations of preventive maintenance logic 110 and is implemented to be performed by preventive maintenance logic 110 of FIG. 1, or by a computing device configured with an algorithm of the method 500. For example, in one embodiment, method 500 is implemented by a computing device configured to execute a computer application. The computer application is configured to process data in electronic form and includes stored executable instructions that perform the functions of method 500.

Method 500 will be described from the perspective that there can be multiple possible maintenance strategies for an asset to be maintained, and that the status of an asset can change at any time. It is desirable to have an appropriate maintenance strategy assigned to the asset based on the current status of the asset without having to rely on human intervention.

Upon initiating method 500, at block 510, status data is read from an asset record of an asset to be maintained. The status data indicates a current status of the asset. In accordance with one embodiment, the asset record is stored in database device 180 of FIG. 1 and is read by status reading logic 130 of FIG. 1. In one embodiment, the asset record is read periodically to determine if the status has changed. In another embodiment, when the status data changes in an asset record, a notification is sent (e.g., from the database device 180 to status reading logic 130) which triggers the asset record to be read.

At block 520, selection of a maintenance schedule record from multiple maintenance schedule records is controlled based on the status data. The multiple maintenance schedule records are associated with a maintenance specification record for the asset, in accordance with one embodiment. Each maintenance schedule record is optimized for a different status of the asset. In one embodiment, selection control logic 140 of FIG. 1 receives the status data from status reading logic 130 of FIG. 1 and controls the selection of the maintenance schedule record.

At block 530, assigning (activating) of the selected maintenance schedule record to (for) the asset record of the asset is controlled. The selected maintenance schedule record includes trigger records that include trigger data indicating when preventive maintenance is to be performed on the asset. In one embodiment, assignment control logic 150 of FIG. 1 receives an identification of the selected maintenance schedule record from selection control logic 140 and assigns (activates) the selected maintenance schedule record to (for) the asset. In another embodiment, assignment control logic 150 receives the actual selected maintenance schedule record from selection control logic 140 and assigns (activates) the selected maintenance schedule record to (for) the asset. In still another embodiment, assigning (activating) the selected maintenance schedule record to (for) the asset involves making the selected maintenance schedule record "active" in the maintenance specification record for the asset.

At block 540, transmitting of a preventive maintenance work order record is controlled, in accordance with a trigger record of the selected maintenance schedule record, to direct preventive maintenance to be performed on the asset. For example, a trigger record may indicate that it has been three-months since preventive maintenance was last performed on the asset, and that it is time for a next preventive maintenance to be performed. Trigger control logic 160 of FIG. 1 controls the transmitting of the work order, in accordance with one embodiment. In one embodiment, the preventive maintenance work order is transmitted directly to a mobile device of a maintenance worker in the field. In another embodiment, the preventive maintenance work order is transmitted to an intermediate dispatcher. The intermediate dispatcher doles out the work orders to maintenance workers in the field (e.g., via email or some other messaging service).

In this manner, as the status of an asset changes, the maintenance strategy is also changed automatically, without the need for human intervention. A maintenance schedule record is available (prepared a priori) for each possible status of the asset. An appropriate maintenance schedule record is selected for the asset based on the current status of the asset.

Figure 6:
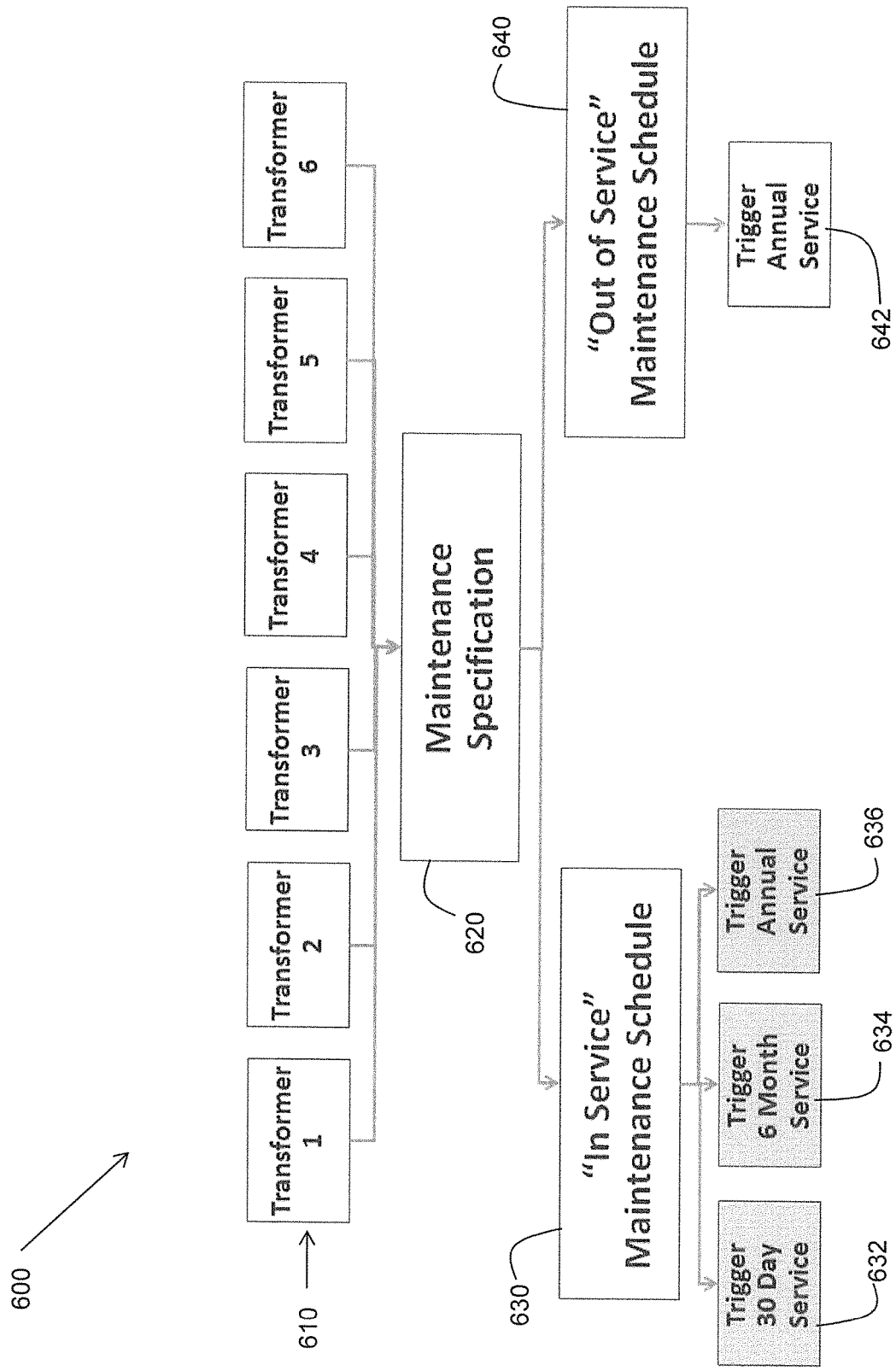
FIG. 6 graphically illustrates an example embodiment of relationships between a plurality of transformer asset records, a maintenance specification record, and two maintenance schedule records each having one or more trigger records.

FIG. 6 graphically illustrates an example embodiment of relationships between multiple transformer asset records 610, a maintenance specification record 620, and two maintenance schedule records 630 and 640 each having one or more trigger records. The maintenance specification record 620 applies to each of the transformer asset records 610. Each transformer asset record 610 corresponds to a different transformer asset in the field.

The maintenance specification record 620 is associated with two maintenance schedule records 630 and 640. Maintenance schedule record 630 is active for an asset (e.g., is selected and assigned to at least one of the transformer asset records 610) when the status of the asset is "in service". Maintenance schedule record 640 is active for an asset (e.g., is selected and assigned to at least one of the transformer asset records 610) when the status of the asset is "out of service".

Maintenance schedule record 630 includes three trigger records. The first trigger record 632 includes trigger data which indicates that preventive maintenance is to be performed 30 days from a specified date (e.g., an in-service date of an asset). The second trigger record 634 includes trigger data which indicates that preventive maintenance is to be performed 6 months from the specified date. The third trigger record 636 includes trigger data which indicates that preventive maintenance is to be performed one year from the specified date (annual service). Maintenance schedule record 640 includes one trigger record 642 that includes trigger data which indicates that preventive maintenance is to be performed annually on an asset that is out of service.

In accordance with one embodiment, user modification of the trigger data within the trigger records may be controlled via a user interface (e.g., a graphical user interface) provided by visual user interface logic 120 of FIG. 1. Similarly, user modification of the maintenance schedule records may be controlled via a user interface (e.g., a graphical user interface) provided by visual user interface logic 120 of FIG. 1. For example, a maintenance schedule record defines which values of the status data select that particular maintenance schedule record. Such values can be modified by a user. Also, user extension of status data types may be controlled via cloud-accessible tools. For example, additional status data types of "high duty cycle" and "low duty cycle" may be added as possibilities by remotely accessing and modifying the source code of a preventive maintenance application that defines the status data types.

Figure 7:
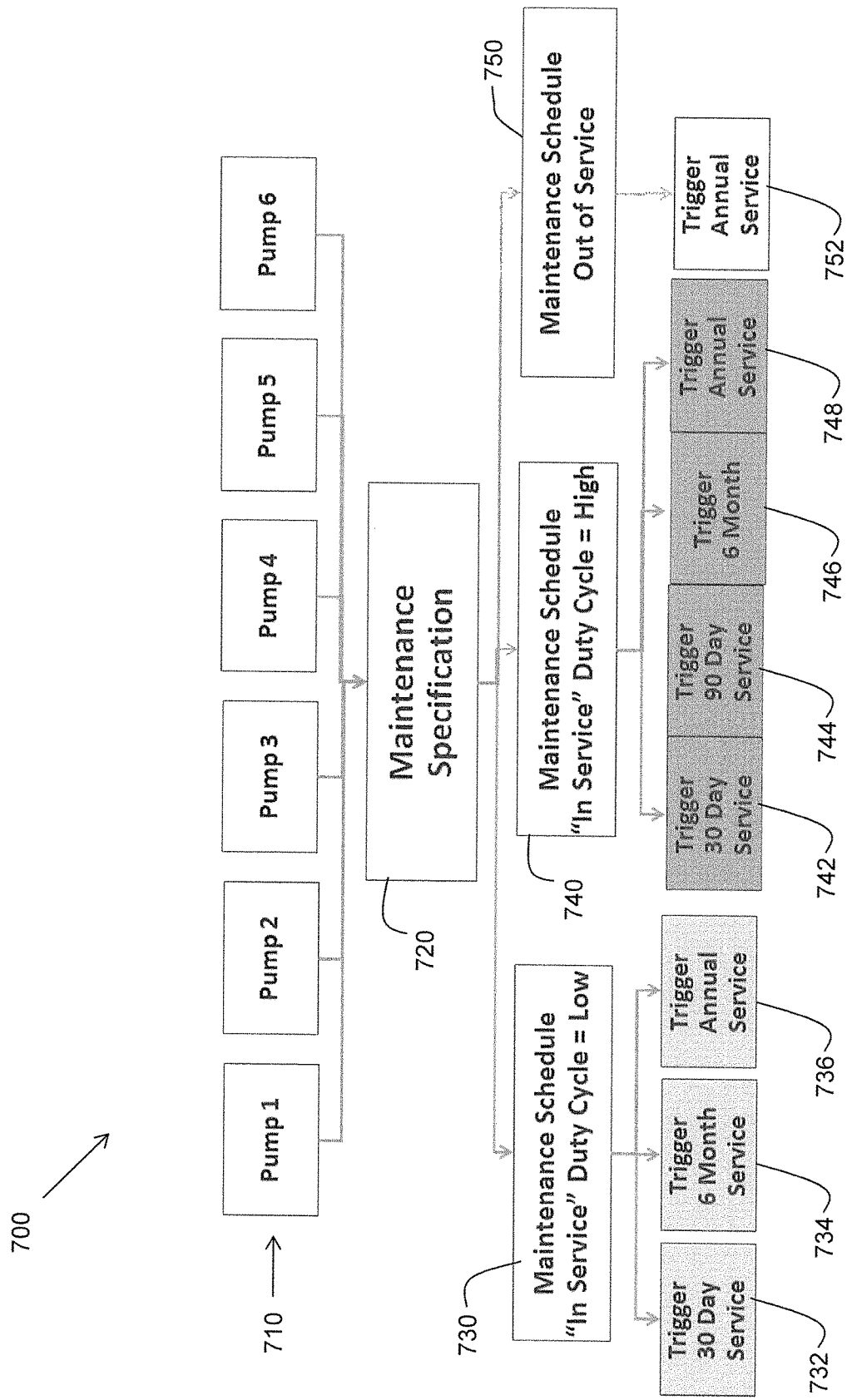
FIG. 7 graphically illustrates a first example embodiment of relationships between a plurality of pump asset records, a maintenance specification record, and three maintenance schedule records each having one or more trigger records.

FIG. 7 graphically illustrates a first example embodiment of relationships between a plurality of pump asset records 710, a maintenance specification record 720, and three maintenance schedule records 730, 740, and 750 each having one or more trigger records. The maintenance specification record 720 applies to each of the pump asset records 710. Each pump asset record 710 corresponds to a different pump asset in the field.

The maintenance specification record 720 is associated with three maintenance schedule records 730, 740, and 750. Maintenance schedule record 730 is active for an asset (e.g., is selected and assigned to at least one of the pump asset records 710) when the status of the asset is "in service" and "low duty cycle". Maintenance schedule record 740 is active for an asset (e.g., is selected and assigned to at least one of the pump asset records 710) when the status of the asset is "in service" and "high duty cycle". Maintenance schedule record 750 is active for an asset (e.g., is selected and assigned to at least one of the pump asset records 710) when the status of the asset is "out of service".

Maintenance schedule record 730 includes three trigger records. The first trigger record 732 includes trigger data which indicates that preventive maintenance is to be performed 30 days from a specified date (e.g., an in-service date of an asset). The second trigger record 734 includes trigger data which indicates that preventive maintenance is to be performed 6 months from the specified date. The third trigger record 736 includes trigger data which indicates that preventive maintenance is to be performed one year from the specified date (annual service).

Maintenance schedule record 740 includes four trigger records. The first trigger record 742 includes trigger data which indicates that preventive maintenance is to be performed 30 days from a specified date (e.g., an in-service date of an asset). The second trigger record 744 includes trigger data which indicates that preventive maintenance is to be performed 90 days from the specified date. The third trigger record 746 includes trigger data which indicates that preventive maintenance is to be performed 6 months from the specified date. The fourth trigger record 748 includes trigger data which indicates that preventive maintenance is to be performed one year from the specified date (annual service). Maintenance schedule record 750 includes one trigger record 752 that includes trigger data which indicates that preventive maintenance is to be performed annually on an asset that is out of service. In accordance with one embodiment, user modifications to the various records and extensions of status data types may be performed as described previously herein.

Figure 8:
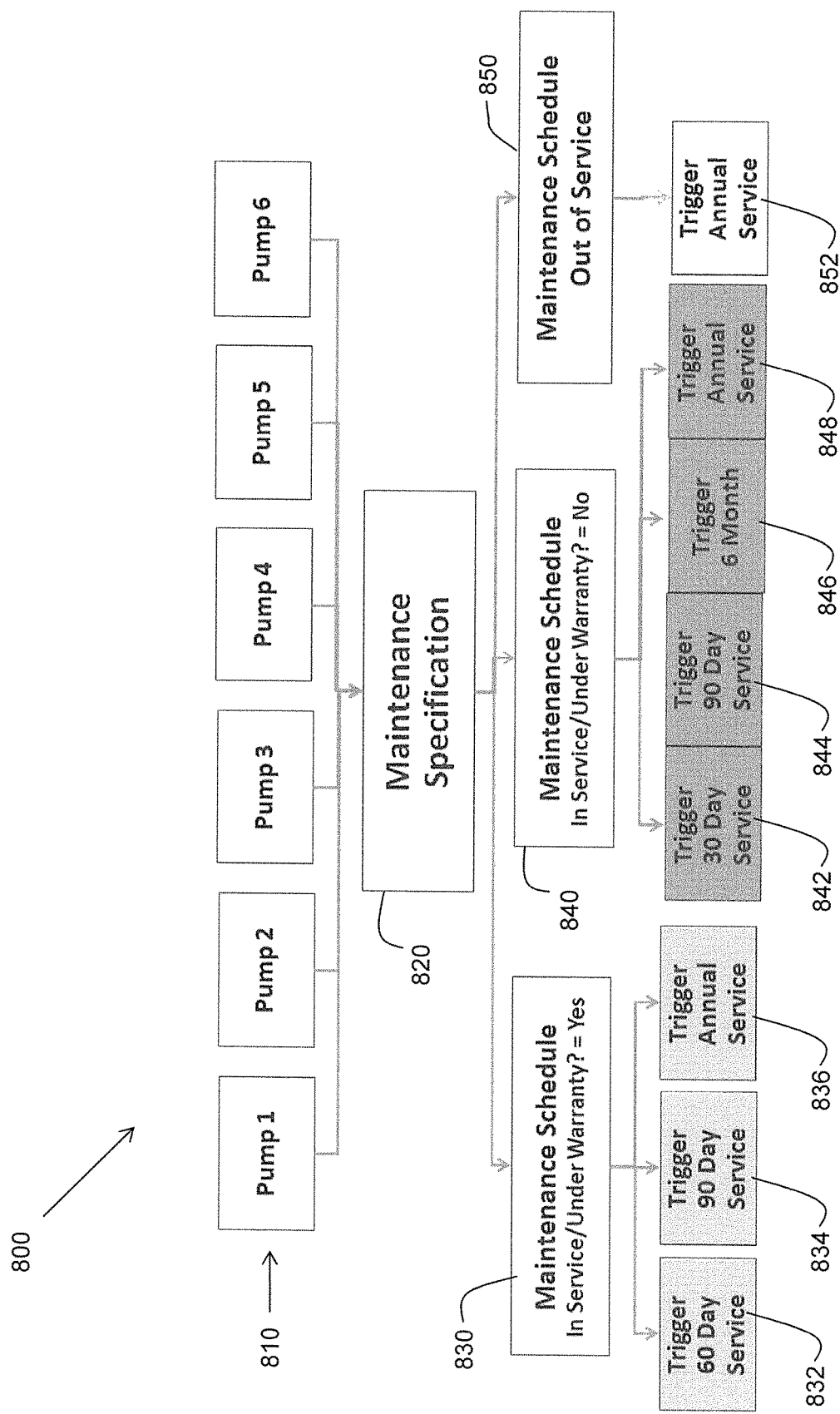
FIG. 8 graphically illustrates a second example embodiment of relationships between a plurality of pump asset records, a maintenance specification record, and three maintenance schedule records each having one or more trigger records.

FIG. 8 graphically illustrates a second example embodiment of relationships between a plurality of pump asset records 810, a maintenance specification record 820, and three maintenance schedule records 830, 840, and 850 each having one or more trigger records. The maintenance specification record 820 applies to each of the pump asset records 810. Each pump asset record 810 corresponds to a different pump asset in the field.

The maintenance specification record 820 is associated with three maintenance schedule records 830, 840, and 850. Maintenance schedule record 830 is active for an asset (e.g., is selected and assigned to at least one of the pump asset records 810) when the status of the asset is "in service" and "under warranty". Maintenance schedule record 840 is active for an asset (e.g., is selected and assigned to at least one of the pump asset records 810) when the status of the asset is "in service" and "not under warranty". Maintenance schedule record 850 is active for an asset (e.g., is selected and assigned to at least one of the pump asset records 810) when the status of the asset is "out of service".

Maintenance schedule record 830 includes three trigger records. The first trigger record 832 includes trigger data which indicates that preventive maintenance is to be performed 60 days from a specified date (e.g., an in-service date of an asset). The second trigger record 834 includes trigger data which indicates that preventive maintenance is to be performed 90 days from the specified date. The third trigger record 836 includes trigger data which indicates that preventive maintenance is to be performed one year from the specified date (annual service).

Maintenance schedule record 840 includes four trigger records. The first trigger record 842 includes trigger data which indicates that preventive maintenance is to be performed 30 days from a specified date (e.g., an in-service date of an asset). The second trigger record 844 includes trigger data which indicates that preventive maintenance is to be performed 90 days from the specified date. The third trigger record 846 includes trigger data which indicates that preventive maintenance is to be performed 6 months from the specified date. The fourth trigger record 848 includes trigger data which indicates that preventive maintenance is to be performed one year from the specified date (annual service). Maintenance schedule record 850 includes one trigger record 852 that includes trigger data which indicates that preventive maintenance is to be performed annually on an asset that is out of service. In accordance with one embodiment, user modifications to the various records and extensions of status data types may be performed as described previously herein.

Computing Device Embodiment

Figure 9:
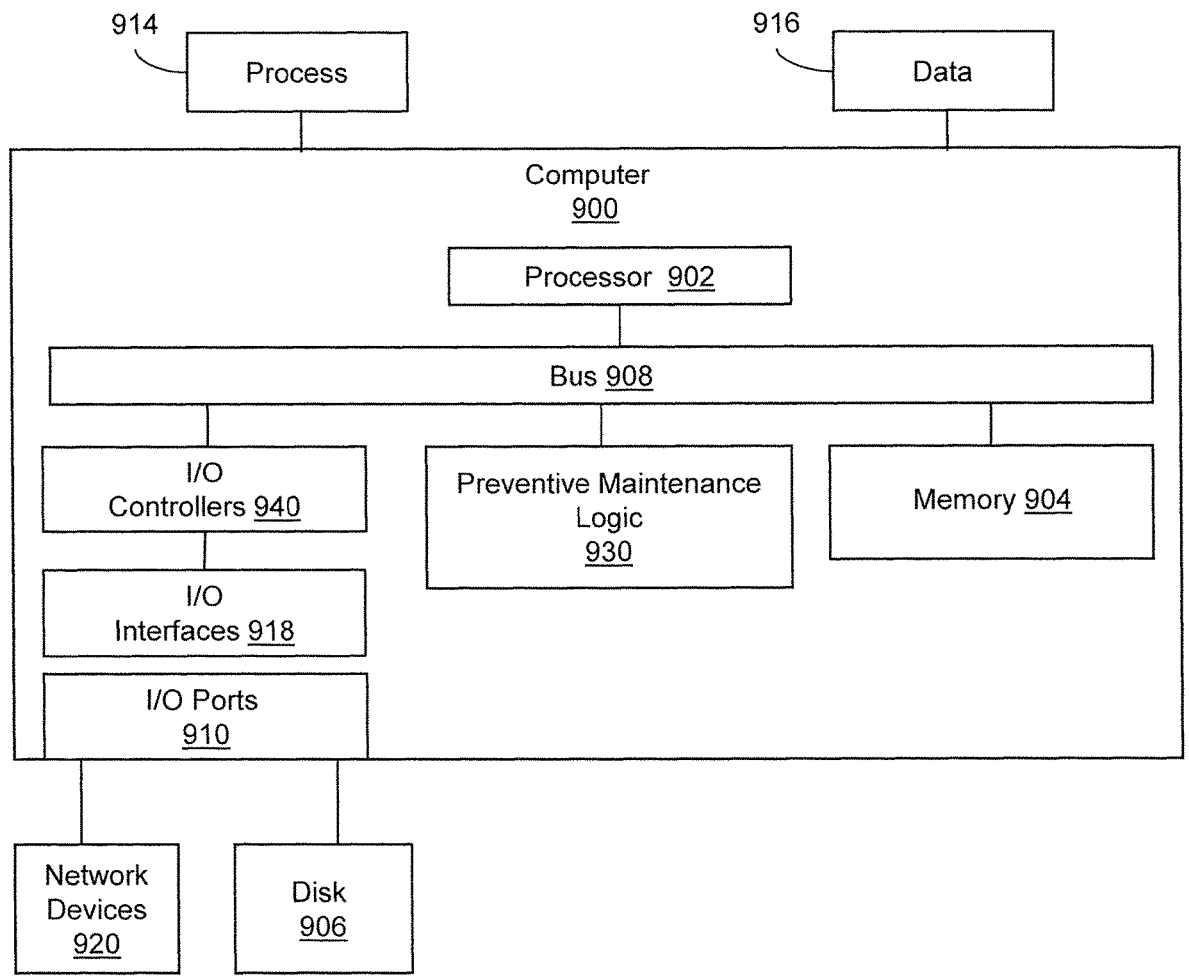
FIG. 9 illustrates one embodiment of a computing device upon which preventive maintenance logic of a computing system may be implemented.

FIG. 9 illustrates an example computing device that is configured and/or programmed with one or more of the example systems and methods described herein, and/or equivalents. FIG. 9 illustrates one example embodiment of a computing device upon which an embodiment of preventive maintenance logic may be implemented. The example computing device may be a computer 900 that includes a processor 902, a memory 904, and input/output ports 910 operably connected by a bus 908.

In one example, the computer 900 may include preventive maintenance logic 930 (corresponding to preventive maintenance logic 110 from FIG. 1) which is configured to control selections of maintenance strategies based on current statuses of assets. In different examples, logic 930 may be implemented in hardware, a non-transitory computer-readable medium with stored instructions, firmware, and/or combinations thereof. While the logic 930 is illustrated as a hardware component attached to the bus 908, it is to be appreciated that in other embodiments, logic 930 could be implemented in the processor 902, a module stored in memory 904, or a module stored in disk 906.

In one embodiment, logic 930 or the computer 900 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the controlling of selections of maintenance strategies based on current statuses of assets. The means may also be implemented as stored computer executable instructions that are presented to computer 900 as data 916 that are temporarily stored in memory 904 and then executed by processor 902.

Logic 930 may also provide means (e.g., hardware, non-transitory computer-readable medium that stores executable instructions, firmware) to control selections of maintenance strategies based on current statuses of assets.

Generally describing an example configuration of the computer 900, the processor 902 may be a variety of various processors including dual microprocessor and other multi-processor architectures. A memory 904 may include volatile memory and/or non-volatile memory. Non-volatile memory may include, for example, ROM, PROM, and so on. Volatile memory may include, for example, RAM, SRAM, DRAM, and so on.

A storage disk 906 may be operably connected to the computer 900 via, for example, an input/output interface (e.g., card, device) 918 and an input/output port 910. The disk 906 may be, for example, a magnetic disk drive, a solid state disk drive, a floppy disk drive, a tape drive, a Zip drive, a flash memory card, a memory stick, and so on. Furthermore, the disk 906 may be a CD-ROM drive, a CD-R drive, a CD-RW drive, a DVD ROM, and so on. The memory 904 can store a process 914 and/or a data 916, for example. The disk 906 and/or the memory 904 can store an operating system that controls and allocates resources of the computer 900.

The computer 900 may interact with input/output devices via the i/o interfaces 918 and the input/output ports 910. Input/output devices may be, for example, a keyboard, a microphone, a pointing and selection device, cameras, video cards, displays, the disk 906, the network devices 920, and so on. The input/output ports 910 may include, for example, serial ports, parallel ports, and USB ports.

The computer 900 can operate in a network environment and thus may be connected to the network devices 920 via the i/o interfaces 918, and/or the i/o ports 910. Through the network devices 920, the computer 900 may interact with a network. Through the network, the computer 900 may be logically connected to remote computers. Networks with which the computer 900 may interact include, but are not limited to, a LAN, a WAN, and other networks.

Systems, methods, and other embodiments have been described that are configured to control selections of maintenance strategies based on current statuses of assets. In one embodiment, status reading logic is configured to read status data from an asset record of an asset to be maintained. The status data indicates a current status of the asset. Selection control logic is configured to control selection of a maintenance schedule record from multiple maintenance schedule records based on the status data. The multiple maintenance schedule records are associated with a maintenance specification record for the asset. Assignment control logic is configured to control assigning of the maintenance schedule record, as selected, to the asset record of the asset. The maintenance schedule record includes one or more trigger records that include trigger data indicating when preventive maintenance is to be performed on the asset. Trigger control logic is configured to control sending (e.g., transmitting) of a preventive maintenance work order record, in accordance with a trigger control record, to direct preventive maintenance to be performed on the asset.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. §101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. §101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method performed by a computing device where the computing device includes at least a processor for executing instructions from a memory, the method comprising:
    maintaining a centralized database that contains asset records for a plurality of remote assets, wherein each asset record for a remote asset is configured as a hierarchy of record relationships and contains at least:
        (i) status data that indicates a current status of the remote asset,
        (ii) a maintenance specification that specifies a type of maintenance to be performed on the remote asset;
        (iii) a plurality of maintenance schedule records associated with the maintenance specification, wherein each maintenance schedule record corresponds to a different status, and
        (iv) at least one trigger record associated with each of the plurality of maintenance schedule records, wherein the at least one trigger record includes trigger data indicating a time period when preventive maintenance is to be performed on the remote asset;
    implementing a cloud-accessible tool residing on one or more server computers that are accessed remotely by one or more users via a computerized network;
    wherein the cloud-accessible tool allows remote access for reading, from the centralized database via the processor, an asset record of an asset and identifying a first maintenance schedule record that is active for the asset based on a current status of the asset;
    generating, by the computing device on a display, a graphical user interface via the cloud-accessible tool to facilitate user interaction and modification of status data from asset records in the centralized database;
    executing a preventative maintenance algorithm, by the computing device as a centralized server-side algorithm, that periodically reads the status data from a plurality of the asset records of the remote assets in the centralized database and determining that the status data in a given asset record indicates the current status of a given asset associated with the given asset record has changed from a first status to a second status;
    wherein the preventative maintenance algorithm is configured for controlling selection of a maintenance schedule record based on the status data and the hierarchy of record relationships for the given asset record including:
    in response to the preventative maintenance algorithm determining that the current status has changed from the first status to the second status in the given asset record, automatically switching, by the preventative maintenance algorithm, the first maintenance schedule record to cause a change in maintenance strategies for the given asset by at least:
        accessing the asset record of the given asset, by the preventative maintenance algorithm, from the centralized database;
        identifying and automatically selecting a second maintenance schedule record from the plurality of maintenance schedule records associated with the given asset record in the hierarchy of record relationships that corresponds to the second status as indicated by the status data;
        controlling, via the processor executing the preventative maintenance algorithm, an assignment of the second maintenance schedule record, as selected, to the asset record of the given asset to activate the second maintenance schedule record for the given asset, wherein the second maintenance schedule record includes at least one trigger record including trigger data indicating when preventive maintenance is to be performed on the given asset; and
        controlling, via the processor executing the preventative maintenance algorithm and via a network communication, transmitting of a preventive maintenance work order record, in accordance with the at least one trigger record of the second maintenance schedule record, to direct preventive maintenance to be performed on the given asset in accordance with the trigger data from the second maintenance schedule record.

2. The method of claim 1, further comprising:
    reading updated status data from the asset record at a second time, via the processor executing the preventative maintenance algorithm, and determining the updated status data indicates a changed status of the given asset from the first status that was read at a previous time;
    controlling, via the processor executing the preventative maintenance algorithm, selection of a different maintenance schedule record from the plurality of maintenance schedule records based on the updated status data;
    controlling, via the processor executing the preventative maintenance algorithm, assigning of the different maintenance schedule record, as selected, to the asset record of the given asset, wherein the different maintenance schedule record includes at least one different trigger record including different trigger data indicating when preventive maintenance is to be performed on the given asset; and controlling, via the processor executing the preventative maintenance algorithm, transmitting of a different preventive maintenance work order record, in accordance with the at least one different trigger record, to direct preventive maintenance to be performed on the given asset.

3. The method of claim 1, further comprising:

reading updated status data from the asset record at a second time, via the processor, and determining the updated status data indicates a changed status of the given asset from the first status that was read at a previous time; and controlling, via the processor, selection of a different maintenance schedule record from the plurality of maintenance schedule records based on the updated status data.

4. The method of claim 1, wherein the status data includes values to indicate that the asset is in service with a high duty cycle or in service with a low duty cycle, and that the asset is in service or out of service.

5. The method of claim 1, wherein the status data indicates that the asset is in service and under warranty or in service and not under warranty.

6. The method of claim 1, wherein the trigger data indicates when preventive maintenance is to be performed on the asset with respect to an in-service date of the asset.

7. The method of claim 1, wherein the trigger data indicates when preventive maintenance is to be performed on the asset with respect to a date when preventive maintenance was last performed on the asset.

8. The method of claim 1, further comprising controlling user modification of the trigger data in the at least one trigger record via a user interface.

9. The method of claim 1, further comprising controlling user modification of the maintenance schedule record via a user interface, wherein the maintenance schedule record defines which values of the status data select the maintenance schedule record.

10. The method of claim 1, further comprising controlling user extension of status data types via the cloud-accessible tool.

11. A computing system, comprising:

a processor;

a memory operably connected to at least the processor;

a non-transitory computer-readable medium operable connected to at least the processor and the memory, and storing instructions that, when executed by the processor, cause the computing system to at least:

maintain a centralized database that contains asset records for a plurality of remote assets, wherein each asset record for a remote asset is configured as a hierarchy of record relationships and contains at least:

(i) status data that indicates a current status of the remote asset, (ii) a maintenance specification that specifies a type of maintenance to be performed on the remote asset, (iii) a plurality of maintenance schedule records associated with the maintenance specification, wherein each maintenance schedule record corresponds to a different status, and (iv) at least one trigger record associated with each of the plurality of maintenance schedule records, wherein the at least one trigger record includes trigger data indicating a time period when preventive maintenance is to be performed on the remote asset;

implement a cloud-accessible tool residing on one or more server computers that are accessed remotely by one or more users via a computerized network;

wherein the cloud-accessible tool allows remote access to read, from the centralized database via the processor, an asset record of an asset and identifying a first maintenance schedule record that is active for the asset based on a current status of the asset generate a graphical user interface to facilitate user interaction and modification of status data from asset records in the centralized database;

execute a preventative maintenance algorithm, by the computing system as a centralized server-side algorithm, that periodically reads the status data from a plurality of the asset records of the remote assets from the centralized database, and determining that the status data in a given asset record indicates the current status of a given asset associated with the given asset record has changed from a first status to a second status;

wherein the preventative maintenance algorithm is configured to control selection of a maintenance schedule record based on the status data and the hierarchy of record relationships for the given asset record including:

in response to the preventative maintenance algorithm determining that the current status has changed to the second status in the given asset record, automatically switching, by the preventative maintenance algorithm, the first maintenance schedule record to cause a change in maintenance strategies for the given asset by at least causing the computing system to:

access the asset record of the given asset, by the preventative maintenance algorithm, from the centralized database;

identify and automatically select a second maintenance schedule record from the plurality of maintenance schedule records associated with the given asset record in the hierarchy of record relationships that corresponds to the second status as indicated by the status data;

assign, via the processor executing the preventative maintenance algorithm, the second maintenance schedule record, as selected, to the asset record of the given asset to activate the second maintenance schedule record for the given asset, wherein the second maintenance schedule record includes at least one trigger record including trigger data indicating when preventive maintenance is to be performed on the given asset; and transmit over a network, via the processor executing the preventative maintenance algorithm, a preventive maintenance work order record, in accordance with the at least one trigger record of the second maintenance schedule record, to direct preventive maintenance to be performed on the asset in accordance with the trigger data from the second maintenance schedule record.

12. The computing system of claim 11, further comprising a visual user interface module stored in the non-transitory computer-readable medium including instructions that when executed cause the processor to provide a graphical user interface for controlling user modification of the trigger data in the at least one trigger record.

13. The computing system of claim 11, further comprising a visual user interface module stored in the non-transitory computer-readable medium including instructions that when executed cause the processor to provide a graphical user interface for controlling user modification of the maintenance schedule record, wherein the maintenance schedule record defines which values of the status data select the maintenance schedule record.

14. The computing system of claim 11, further comprising a visual user interface module stored in the non-transitory computer-readable medium including instructions that when executed cause the processor to provide a graphical user interface for controlling user extension of status data types via cloud-accessible tools.

15. The computing system of claim 11, further comprising:
a visual user interface module stored in the non-transitory computer-readable medium including instructions that when executed cause the processor to provide the graphical user interface; and
a display screen configured to display and facilitate user interaction with at least the graphical user interface provided by the visual user interface module.

16. The computing system of claim 11, further comprising a database device configured to maintain the centralized database to store at least the asset records, including the maintenance specification record, the plurality of maintenance schedule records, and the at least one trigger record.

17. The computing system of claim 11, wherein:
the status data indicates that the asset is one or more of in-service or out-of-service, high duty cycle or low duty cycle, or under warranty or not under warranty; and
the trigger data indicates when preventive maintenance is to be performed on the asset with respect to one of an in-service date of the asset or a date when preventive maintenance was last performed on the asset.

18. A non-transitory computer-readable medium storing instructions that, when executed by one or more processors of a computing device, cause the computing device to at least:
maintain a centralized database that contains asset records for a plurality of remote assets, wherein each asset record for a remote asset is configured as a hierarchy of record relationships and contains at least:
(i) status data that indicates a current status of the remote asset,
(ii) a maintenance specification that specifies a type of maintenance to be performed on the remote asset,
(iii) a plurality of maintenance schedule records associated with the maintenance specification, wherein each maintenance schedule record corresponds to a different status, and
(iv) at least one trigger record associated with each of the plurality of maintenance schedule records, wherein the at least one trigger record includes trigger data indicating a time period when preventive maintenance is to be performed on the remote asset;
implement a cloud-accessible tool residing on one or more server computers that are accessed remotely by one or more users via a computerized network;
wherein the cloud-accessible tool is configured to allow remote access to read, from the centralized database via the processor, an asset record of an asset and identifying a first maintenance schedule record that is active for the asset based on a current status of the asset;
generate a graphical user interface via the cloud-accessible tool to facilitate user interaction and modification of status data from asset records in the centralized database;
execute a preventative maintenance algorithm, by the computing system as a centralized server-side algorithm, that periodically reads the status data from a plurality of the asset records of the remote assets from the centralized database, and determining which asset records from the plurality of asset records include status data that indicates the current status of a given asset has changed from a first status to a second status;
wherein the preventative maintenance algorithm is configured to control selection of a maintenance schedule record based on the status data and the hierarchy of record relationships for a given asset record including:
in response to the preventative maintenance algorithm determining that the current status has changed to the second status in the given asset record, automatically switch, by the preventative maintenance algorithm, the first maintenance schedule record to cause a change in maintenance strategies for the given asset by at least causing the computing system to:
access the asset record of the given asset, by the preventative maintenance algorithm, from the centralized database;
identify and automatically select a second maintenance schedule record from the plurality of maintenance schedule records associated with the given asset record in the hierarchy of record relationships that corresponds to the second status as indicated by the status data;
control, via the one or more processors executing the preventative maintenance algorithm, assigning of the second maintenance schedule record, as selected, to the asset record of the given asset to activate the second maintenance schedule record for the given asset and remove an assignment of the first maintenance schedule record from the given asset, wherein the second maintenance schedule record includes at least one trigger record including trigger data indicating when preventive maintenance is to be performed on the given asset; and
control, via the one or more processors executing the preventative maintenance algorithm, via a network communication, transmitting of a preventive maintenance work order record, in accordance with the at least one trigger record of the second maintenance schedule record, to direct preventive maintenance to be performed on the given asset in accordance with the trigger data from the second maintenance schedule record.

19. The non-transitory computer-readable medium of claim 18, wherein the instructions further comprise instructions that, when executed by the one or more processors, cause the computing device to at least:
read updated status data from the asset record at a second time being after the first time, via the one or more processors, and determine that the updated status data indicates a changed status of the asset from the first status that was read at a time previous to the second time;
control, via the one or more processors, selection of a different maintenance schedule record from the plurality of maintenance schedule records based on the updated status data;

control, via the one or more processors, assigning of the different maintenance schedule record, as selected, to the asset record of the given asset, wherein the different maintenance schedule record includes at least one different trigger record including different trigger data indicating when preventive maintenance is to be performed on the given asset; and control, via the one or more processors, transmitting of a different preventive maintenance work order record, in accordance with the at least one different trigger record, to direct preventive maintenance to be performed on the given asset.

20. The non-transitory computer-readable medium of claim 18, wherein the instructions further comprise instructions that, when executed by the one or more processors, cause the computing device to at least control, via the one or more processors:

provide a user interface configured to allow user modification of the trigger data in the at least one trigger record via the user interface;

allow user modification of the maintenance schedule record via the user interface, wherein the maintenance schedule record defines which values of the status data select the maintenance schedule record; and allow user extension of status data types via the cloud-accessible tool.

\* \* \* \* \*

UNITED STATES PATENT AND TRADEMARK OFFICE
CERTIFICATE OF CORRECTION

PATENT NO. : 11,636,446 B2
APPLICATION NO. : 15/181564
DATED : April 25, 2023
INVENTOR(S) : Scott et al.

It is certified that error appears in the above-identified patent and that said Letters Patent is hereby corrected as shown below:

In the Specification

In Column 5, Lines 7-16, delete "FIG. 2. The maintenance specification record 220 is associated with two maintenance schedule records 310 and 320 as shown in FIG. 3. Maintenance schedule record 310 is an "in service" maintenance schedule record (i.e., a maintenance schedule record that may be followed when the asset is in service, according to the status data). Maintenance schedule record 320 is an "out of service" maintenance schedule record (i.e., a maintenance schedule record that may be followed when the asset is out of service, according to the status data)." and insert the same on Column 5, Line 6, as a continuation of the same paragraph, therefor.

In Column 10, Line 65, delete "on)." and insert -- on. --, therefor.

In the Claims

In Column 16, Line 11, in Claim 11, delete "asset" and insert -- asset; --, therefor.

Signed and Sealed this
Twenty-seventh Day of February, 2024

Katherine Kelly Vidal
*Director of the United States Patent and Trademark Office*